United States Patent
Bongfeldt (10) Patent No.: US 7,088,953 B2
(45) Date of Patent: Aug. 8, 2006

(54) COVERAGE AREA SIGNATURE IN AN ON-FREQUENCY REPEATER

(75) Inventor: David Bongfeldt, Stittsville (CA)

(73) Assignee: Spotwave Wireless Canada Inc., Ottawa (CA)

(*) Notice: Subject to any disclaimer, the term of this patent is extended or adjusted under 35 U.S.C. 154(b) by 1082 days.

(21) Appl. No.: 09/919,888

(22) Filed: Aug. 2, 2001

(65) Prior Publication Data

US 2002/0044594 A1    Apr. 18, 2002

Related U.S. Application Data

(63) Continuation-in-part of application No. 09/809,218, filed on Mar. 16, 2001, now abandoned.

(30) Foreign Application Priority Data

Oct. 18, 2000    (CA) .................................... 2323881

(51) Int. Cl.
*H04B 7/14* (2006.01)
(52) U.S. Cl. .................... 455/24; 455/63.1; 455/78; 455/296
(58) Field of Classification Search ............... 455/24, 455/63.1, 78, 79, 80, 81, 82, 83, 296
See application file for complete search history.

(56) References Cited

U.S. PATENT DOCUMENTS

| 4,317,217 | A |   | 2/1982 | Davidson et al. |
|---|---|---|---|---|
| 4,849,963 | A |   | 7/1989 | Kawano et al. ............... 370/30 |
| 5,564,074 | A |   | 10/1996 | Juntti ......................... 455/67.1 |
| 5,812,951 | A |   | 9/1998 | Ganesan et al. ............. 455/445 |
| 5,815,795 | A |   | 9/1998 | Iwai ............................... 455/9 |
| 5,835,848 | A | * | 11/1998 | Bi et al. ........................ 455/24 |
| 5,937,332 | A |   | 8/1999 | Karabinis ................. 455/12.1 |
| 2002/0044594 | A1 |   | 4/2002 | Bongfeldt |

FOREIGN PATENT DOCUMENTS

| EP | 0 302 455 A2 | 2/1989 |
|---|---|---|
| EP | 0 724 336 A2 | 7/1996 |
| EP | 0 851 606 A2 | 1/1998 |

* cited by examiner

*Primary Examiner*—Matthew Anderson
*Assistant Examiner*—Philip J. Sobutka
(74) *Attorney, Agent, or Firm*—Kent Daniels; Ogilvy Renault LLP (57) ABSTRACT

A system operates to adaptively control the stability of an on-frequency repeater. A unique signature is imposed on RF signals transmitted by the repeater, and RF signals received by the repeater analyzed to detect signal components corresponding to the signature. The signature and the detected signal components are correlated by a micro-controller, which operates in accordance with an Adaptive Control Algorithm to adjust the ERP of RF signals transmitted by the repeater to limit signal leakage and thereby control the stability of the repeater.

46 Claims, 6 Drawing Sheets

COVERAGE AREA SIGNATURE IN AN ON-FREQUENCY REPEATER

CROSS-REFERENCE TO RELATED APPLICATIONS

This application is a Continuation-in-Part of U.S. patent application Ser. No. 09/809,218, filed on Mar. 16, 2001.

MICROFICHE APPENDIX

Not Applicable.

TECHNICAL FIELD

The present application relates to wireless access networks and, in particular, to a method and system for enabling Adaptive-Coverage Area Control in an on-frequency repeater.

BACKGROUND OF THE INVENTION

In the modern communications space, wireless access networks are increasingly popular, as they enable subscribers to access communications services without being tied to a fixed, wireline communications device. Conventional wireless access network infrastructure (e.g., base stations) is typically "built out", by a network service provider, using a network-centric approach. Thus the build-out normally begins with major Metropolitan Service Areas (MSAs) using base stations located at the center of overlapping coverage areas or "cells". The build-out, and corresponding wireless communications services, subsequently migrates outward from the MSAs to areas of lower population/service densities (e.g., urban to suburban to rural, etc.). At some point, usually dictated by economics, the build-out slows and/or becomes spotty leaving many individual wireless subscribers with unreliable or non-existent service.

On-frequency repeaters are known in the art for improving wireless services within defined regions of a wireless network (e.g., within a building or a built-up area). Such on-frequency repeaters are typically provides by the wireless network provider in order to improve signal quality in high noise or attenuation environments, where signal levels would otherwise be too low for satisfactory quality of service. In some cases, a wireless network provider may install a repeater in order to improve service in an area lying at an edge of the coverage area serviced by a base station, thereby effectively extending the reach of the base-station.

Prior art repeaters are part of a network-centric, view of the wireless network space, in that they are comparatively large systems provided by the network provider in order to improve wireless service to multiple subscribers within a defined area. As such, they form part of the network "build-out plan" of the network provider. These systems suffer the disadvantage in that an individual subscriber cannot benefit from the improved services afforded by the repeater unless they happen to be located within the coverage area of the repeater. However, there are many instances in which wireless subscribers may reside or work in areas where the coverage area of the wireless network is unreliable. Typical examples include mobile subscribers, and subscribers located in suburban and rural areas. Also, in-building coverage can be unreliable even within MSAs, depending on the size, location and construction of buildings and/or other obstacles. In such cases, it may be uneconomical for a network provider to build-out the network to provide adequate coverage, thereby leaving those subscribers with inadequate wireless services.

Accordingly, Applicant's co-pending U.S. patent application Ser. No. 09/809,218, filed on Mar. 16, 2001 and entitled Adaptive Personal Repeater, the contents of which are incorporated herein by reference, provides a method and apparatus that enables an individual subscriber to cost-effectively access high quality wireless communications services, independently of the location of the subscriber. The Adaptive Personal Repeater (APR) transparently mediates signaling between a subscriber's wireless communications device (WCD) and a transceiver (base station) of a wireless communications network. The APR includes a Directional Donor Unit (DDU) and a Subscriber Coverage Unit (SCU). The DDU maintains a network link with the base station of the wireless communications network. The SCU maintains a local link with the WCD within a personal wireless space of the APR. Total system gain is divided between., and integrated with, the DDU and the SCU, so that a separate gain and system control unit is not required. This division of system gain also enables high-performance on-frequency repeater functionality to be obtained without the use of high-cost components and building blocks.

As described in U.S. patent application Ser. No. 09/809,218, the APR represents a subscriber-centric solution for improving wireless services as required by one or more subscribers, and in a manner that is transparent to the network. However, in order to provide this functionality, it is necessary for the repeater to provide sufficient system gain in each of the uplink and downlink paths to compensate for propagation losses in these paths. On the other hand, if the system gain (in either the uplink or downlink paths) is too high, signal leakage between the two antennas will cause system oscillation. In principle, system stability can be obtained by ensuring that the antenna isolation is equal to or less than the system gain. However, in practice, the antenna isolation is difficult to predict (due to signal reflections in the environment within which the antennas are located), and will frequently change over time. Accordingly, conventional on-frequency repeaters are normally adjusted to provide a total system gain of about 10–15 db less than the antenna isolation, it order to provide an unconditionally stable system that precludes oscillation (even in a changing RF environment). This high (10–15 db) margin between antenna isolation and system gain is commonly achieved by limiting and sacrificing system gain, which significantly decreases the sensitivity (and thus efficiency) of the repeater.

Typically, antenna isolation and system gain are adjusted by service personnel during installation and set-up of the repeater unit, in order to achieve satisfactory performance. However, this is labor-intensive, iterative operation requiring skilled technicians using specialized equipment. This increases the cost and complexity of installing and maintaining the repeater, and thereby greatly discourages individual subscribers from acquiring a repeater for their personal use.

As is well known in the art, base stations and repeaters will frequently have overlapping coverage areas. Where one or more transmitters have overlapping coverage areas, signals from each of the transmitters will tend to interfere with one another. In particular, at locations within the overlapping coverage area where the phase difference between signals propagating from each transmitter approaches zero degrees, the signals will tend to interfere constructively, thereby increasing the signal power received by a subscriber's wireless communications device. Conversely, as the phase difference approaches 180°, the signals will interfere destructively to thereby reduce the signal power received by the subscriber's wireless communications device.

As may be appreciated, the extent of destructive interference will be a function of both signal amplitude and phase of each of the interfering signals. In particular, destructive interference increases as the phase difference approaches 180°, and as the difference between the signal powers approaches zero. Thus, when the signal powers are equal and the phase difference is 180°, the two signals will exactly cancel one another so that subscriber's wireless communications device will not receive any signal at all. Even when interfering signals do not completely cancel one another, destructive interference can sufficiently reduce the received signal power to prevent successful wireless communications. A region within which this occurs is referred to as a spatial null.

The geographical locations of spatial nulls within the coverage area of the network generally depend on the number, location and effective radiated power (ERP) of each transmitter serving an area, as well as the characteristics of the propagation paths from each of the transmitters. Because of the large number of variables, it is frequently difficult to predict the location of spatial nulls within the coverage area of a network. Accordingly, wireless network providers frequently do little to find and mitigate spatial nulls. Most subscribers are unaware of the existence of spatial nulls, and thus are confronted by unexplained interruptions in communications as they move from one location to another.

Accordingly, a method and system capable of enhancing wireless access by adaptively controlling system stability and mitigating spatial nulls, at a moderate cost, remains highly desirable.

SUMMARY OF THE INVENTION

An object of the present invention is to provide an method and system for adaptively controlling the system stability of an on-frequency repeater of a wireless communications network.

A further object of the present invention is to provide a method and system for actively mitigating the effect of spatial nulls within overlapping coverage area of a wireless communications network.

Accordingly, an aspect of the present invention provides a method of adaptively controlling system stability of an on-frequency repeater. A signature signal uniquely associated with the repeater is generated and inserted into a first RF signal transmitted by the repeater. The signature signal enables a correlation between the signature signal and a second RF signal received by the repeater to be detected. An effective radiated power (ERP) of the first RF signal transmitted by the repeater can then be controlled, based on the detected correlation.

Another aspect of the present invention provides a system for adaptively controlling a system stability of an on-frequency repeater of a wireless communications network. The system comprises: a signal generator; a first modulator; a detector; and a micro-controller. The signal generator operates to generate a signature signal uniquely associated with the repeater. This signature signal is inserted into a first RF signal (transmitted by the repeater) by the first modulator. The detector detects a correlation between the signature signal and a second RF signal received by the repeater, and the micro-controller controls an effective radiated power (ERP) of the first RF signal transmitted by the repeater, based on the detected correlation.

In some embodiments, the signature signal is generated by generating a unique code signal, and then shaping the code signal. The unique code signal may be a unique sequence of bits. Preferably, such a sequence of bits is spectrally white, and may be pre-selected from among a set of orthogonal bit sequences. The use of spectrally white (e.g. pseudo-random) sequence of bits minimizes any impact on the performance of a receiver (such as a subscriber's wireless communications device) caused by insertion of the signature signal into the first RF signal, which is subsequently transmitted by the repeater and received by the subscriber's wireless communications device. In general, a spectrally white sequence appears as a random spectral distribution of the first RF signal in the RF band, which can be readily compensated by conventional receiver circuitry. The use of orthogonal bit sequences enables the repeater to readily distinguish its signature signal from, those of other repeaters, thereby enabling efficient operation of multiple repeaters with overlapping coverage areas.

In some embodiments, the code signal can be generated as a predetermined low-level faded signal. Fading the signature signal in this manner further reduces the possibility of the signature signal degrading the performance of a receiver.

The signature signal may be inserted into the first RF signal by modulating a parameter of the first RF signal. The parameter may be one or more of: a power level and a phase. Because frequency modulation is normally used to convey content of a communications session, the power level (amplitude) and/or the phase may be varied flatly over the RF band without interfering with an on-going communications session.

The correlation between the signature signal and the second RF signal may be detected by monitoring the second RF signal to detect a signal component consistent with the signature signal. The detected signal component can be compared to the signature signal, and the comparison result used to generate a correlation signal indicative of a degree of similarity between the detected signal component and the signature signal.

The second RF signal can be monitored by sampling the second RF signal; digitally filtering the sample signal; comparing the filtered signal to a predetermined threshold; and generating the signal component based on the comparison result. The signal component can then be compared to the signature signal by logically comparing (e.g. by either one of Exclusive ORing, and ANDing) respective successive bits of each of the detected signal component and the signature signal, and averaging the comparison result. Alternatively, the signal component can be compared to the signature signal by calculating a cross-correlation of the detected signal component and the signature signal.

In either case, the effective radiated power (ERP) of the first RF signal can be controlled by comparing the detected correlation to a predetermined threshold value, and determining an optimum value of a gain of the repeater using the comparison result.

A further aspect of the present invention provides method of controlling spatial nulls within an area of overlapping coverage served by at least two transmitters. A signature signal uniquely associated with a selected transmitter is generated, and used to control modulation of a respective RF signal transmitted by the selected transmitter. Modulation of the RF signal causes a corresponding movement of spatial nulls within the area of overlapping coverage.

In some embodiments, the signature signal is based on a unique code signal, which may include a unique sequence of bits. The sequence of bits may be spectrally white, and may be pre-selected from among a set of predetermined orthogonal bit sequences.

The RF signal transmitted by the selected transmitter may be modulated by controlling a parameter of the RF signal in accordance with the signature signal. The parameter may comprise either one or both of a power level and a signal phase. In preferred embodiments, the parameter is simultaneously controlled across all RF signals within a predetermined wide-band signal path of the selected transmitter.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The following description utilizes exemplary power levels, power ranges, channel frequencies and band-widths in order to illustrate various features of the present invention. Those skilled in the art will appreciate, however, that the present invention is by no means limited to such values. On the contrary, those skilled in the art will readily understand that the present invention can be deployed for use in conjunction with any wireless communications network, and it is to be expected that the power levels, power ranges, channel frequencies, and band-widths stated herein will be modified to conform to the requirements of the communications network in question. Such modifications are considered to be well within the purview of those of ordinary skill in the art, and lie within the intended scope of the appended claims.

Figure 1:
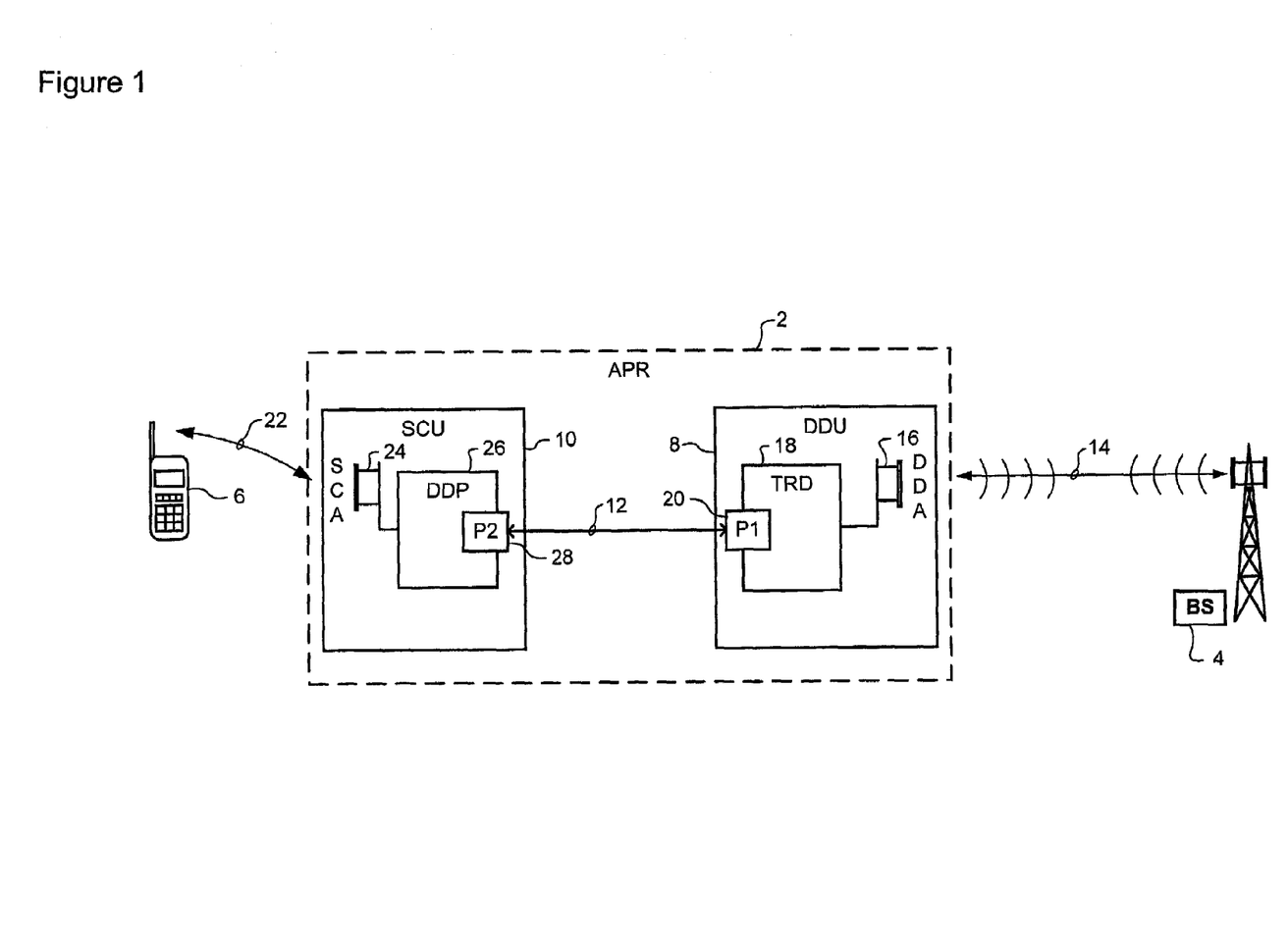
FIG. 1 is a block diagram schematically illustrating principle elements of an exemplary on-frequency repeater in which the present invention may be deployed.

A first aspect of the present invention provides a system for adaptively controlling a coverage area of an on-frequency repeater, such as, for example, an Adaptive Personal Repeater (APR) described in applicant's co-pending U.S. patent application Ser. No. 09/809,218. In general, an on-frequency repeater operates to mediate RF signal traffic between transceivers of the wireless communications network. Thus the APR creates a local wireless space encompassing one or more mobile transceivers (e.g., subscribers' wireless communications device(s)), and maintains a reliable fixed wireless link to a fixed transceiver (e.g., a base station) in order to "reach back" into the reliable coverage area of the wireless communications network to provide high quality wireless services in an otherwise poorly serviced area of the network. The system of the invention operates to control the coverage area of the repeater to facilitate reliable communications between the subscriber's wireless communications device(s) and the network, while mitigating potential interference. FIG. 1 is a block diagram schematically illustrating principle elements of an exemplary repeater in which the system of the present invention may be deployed.

As shown in FIG. 1, the repeater 2 is functionally positioned between a base station 4 of the wireless communications network (not shown) and the subscriber's Wireless Communications Device (WCD) 6. The repeater 2 is an "on-frequency" repeater, in that uplink and downlink RF signals are conveyed through the repeater 2 without altering the respective channel frequencies. The repeater 2 selectively receives and controls (i.e., amplifies or attenuates) RF signals, without performing any signal formatting or protocol conversion, thereby rendering the repeater 2 transparent to both the base station 4 and the WCD 6. The subscriber's WCD 6 may take the form of any conventional wireless communications device, such as, for example, Personal Digital Assistants (PDA's), wireless telephone handsets, pagers, and one and two-way wireless messaging devices.

It will be appreciated that the subscriber may possess multiple WCDs 6, and may use any one or more WCDs 6 simultaneously. Similarly, multiple subscribers may be located within the wireless space of a single repeater 2. However, for ease of description of the invention, the illustrated embodiment includes a single WCD 6 within the wireless space defined by the repeater 2.

In the embodiment of FIG. 1, the repeater 2 comprises a Directional Donor Unit (DDU) 8 and a Subscriber Coverage Unit (SCU) 10. The DDU 8 and SCU 10 may be suitably coupled to each other, for example via a coaxial cable 12, as shown in FIG. 1.

The Directional Donor Unit (DDU) 8 operates to establish and maintain a network link 14 between the repeater 2 and the base station 4. Preferably the DDU 8 is designed to receive downlink signals from the base station 4 at power levels as low as −120 dBm, and transmit uplink signals to the base station 4 at an ERP of up to +37 dBm. This transmit and receive performance of the DDU 8 enables maintenance of the network link 14 with the base station 4, even when the DDU 8 is located well beyond the conventional cell and/or network coverage area boundary. In the illustrated embodiment, the DDU 8 is provided are single port active antenna comprising a Directional Donor Antenna (DDA) 16 integrated with a Transceiver Diplexer (TRD) 18. A bi-directional port 20 couples the DDU 8 to the SCU 10 via the coaxial cable 12.

The Subscriber Coverage Unit (SCU) 10 operates to maintain a local wireless link 22 between the repeater 2 and the subscriber's WCD 6, and define the coverage area of the repeater 2. It is anticipated that the coverage area will be very much smaller than a conventional cell of the wireless communications network. For example, in some embodiments, it is expected that the coverage area will extend 25 m (or less) from the SDU 10. Other embodiments may provide a larger or smaller coverage area, as desired.

In the illustrated embodiment, the Subscriber Coverage Unit (SCU) 10 is provided as a single port active antenna comprising a Subscriber Coverage Antenna (SCA) 24 integrated with a dual-directional processor (DDP) 26. A bi-directional port 28 couples the SCU 10 to the DDU 8 via the coaxial cable 12.

Figure 2:
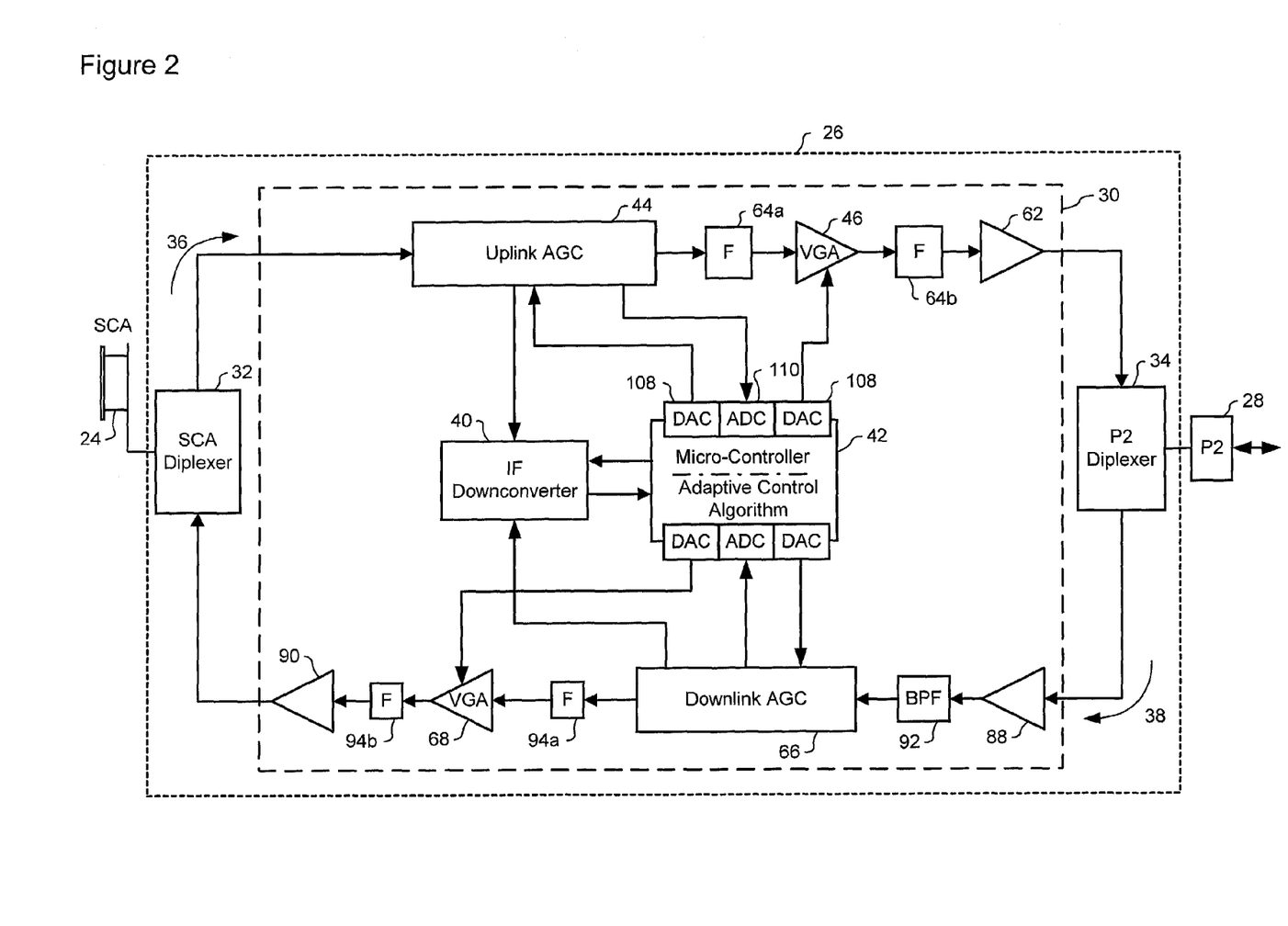
FIG. 2 is a block diagram schematically illustrating principle elements of an exemplary system it accordance with an embodiment of the present invention.

The DDP 26 comprises an Intelligent Gain Controller (IGC) 30 connected between an SCA diplexer 32 and a port diplexer 34. As shown in FIG. 2, the SCA diplexer 32 is coupled to the SCA 24, and the port diplexer 34 is coupled to the bi-directional port 28. These diplexers 32 and 34 operate to separate uplink and downlink signal paths 36 and 38 at the SCA 24 and port 28, respectively. The diplexers 32 and 34 also operate to define and limit the frequency band(s) over which the IGC 30 must maintain stability.

As shown in FIG. 2, the IGC 30 is provided as a hybrid RF, analog and digital processing module capable of detecting and selectively controlling (i.e., amplifying and/or attenuating) RF signal traffic between the base station 4 and the WCD 6. The use of a hybrid processing module in this manner enables the IGC 30 to utilize mathematical (i.e., analog) signal conditioning and gain control techniques, in combination with knowledge-based (i.e., software) control of signal detection and system behaviour.

As shown in FIG. 2, the IGC 30 includes a wide-band uplink signal path 36 and a wide-band downlink signal path 38 coupled between the diplexers 32 and 34, and an IF down-converter and narrow-band detector 40, all of which are controlled by a micro-controller 42 in accordance with an Adaptive Control Algorithm (ACA). Each of the uplink and downlink paths 36 and 38 are, designed to control, condition and process RF signals within their respective wide-band uplink and downlink channels.

In general, the band-width of the wide-band signal paths 36, 38 will be determined by the communications network, typically in accordance with published standards. For example, in North America, publicly accessible cellular communications networks utilize a 25 MHz uplink and downlink channel bandwidth centered on 836.5 MHz and 881.5 MHz, respectively. Accordingly, for North American installations, the uplink and downlink signal paths 36 and 38 can be suitably designed to process RF signals over the entire corresponding 25 MHz band-widths. However, it will be appreciated that different band-widths, and different center frequencies, can be utilized, as desired.

In general, RF signal traffic received by the APR 2 (from either the base station 4 or the WCD 6) is detected by the broadband detectors 44 and 66 and the narrowband down-converter and detector 40, and used by the micro-controller 42 to adaptively control the stability of the repeater 2 by controlling the ERP of RF signal traffic transmitted by the DDA 16 and the SCA 24.

More particularly, the IGC 30 of the present invention operates to control (amplify and/or attenuate) uplink channel RF signals received from the WCD 6 for transmission to the base station 4 with a repeater uplink Effective Radiation Power (ERP) that is adjusted (by operation of the IGC 30) to a minimum value consistent with satisfactory link performance and prevention of system oscillation. It is expected that a repeater uplink ERP of between about −23 dBm and about +37 dBm will yield satisfactory performance for most installations.

In the downlink path, the IGC 30 controls the downlink channel RF signals received from the base station 4 for transmission to the WCD 6 with a repeater downlink ERP that is continuously adjusted (by the IGC 30) to a minimum value consistent with satisfactory performance of the local link 22, and so adaptively control system stability in the downlink path, as will be described in greater detail below. It is anticipated that an repeater downlink ERP of up to about −10 dBm will yield satisfactory performance for most installations.

Referring to FIG. 2, the uplink path 36 comprises a wide-band uplink Automatic Gain Controller (AGC) 44 and a slaved variable gain amplifier (VGA) 46. The uplink AGC 44 interfaces with the down-converter 40 and the micro-controller 42, as will be described in greater detail below. In preferred embodiments, the uplink path 36 is designed to receive, process and transmit RF signals across the entire uplink channel RF operating band. This processing bandwidth is only limited by the network system bandwidth. For example,. North American 800 MHz cellular networks utilize an uplink frequency bandwidth of 25 MHz centered at 836.5 MHz and is divided into carrier A and Carrier B sub-bands.

Figure 3:
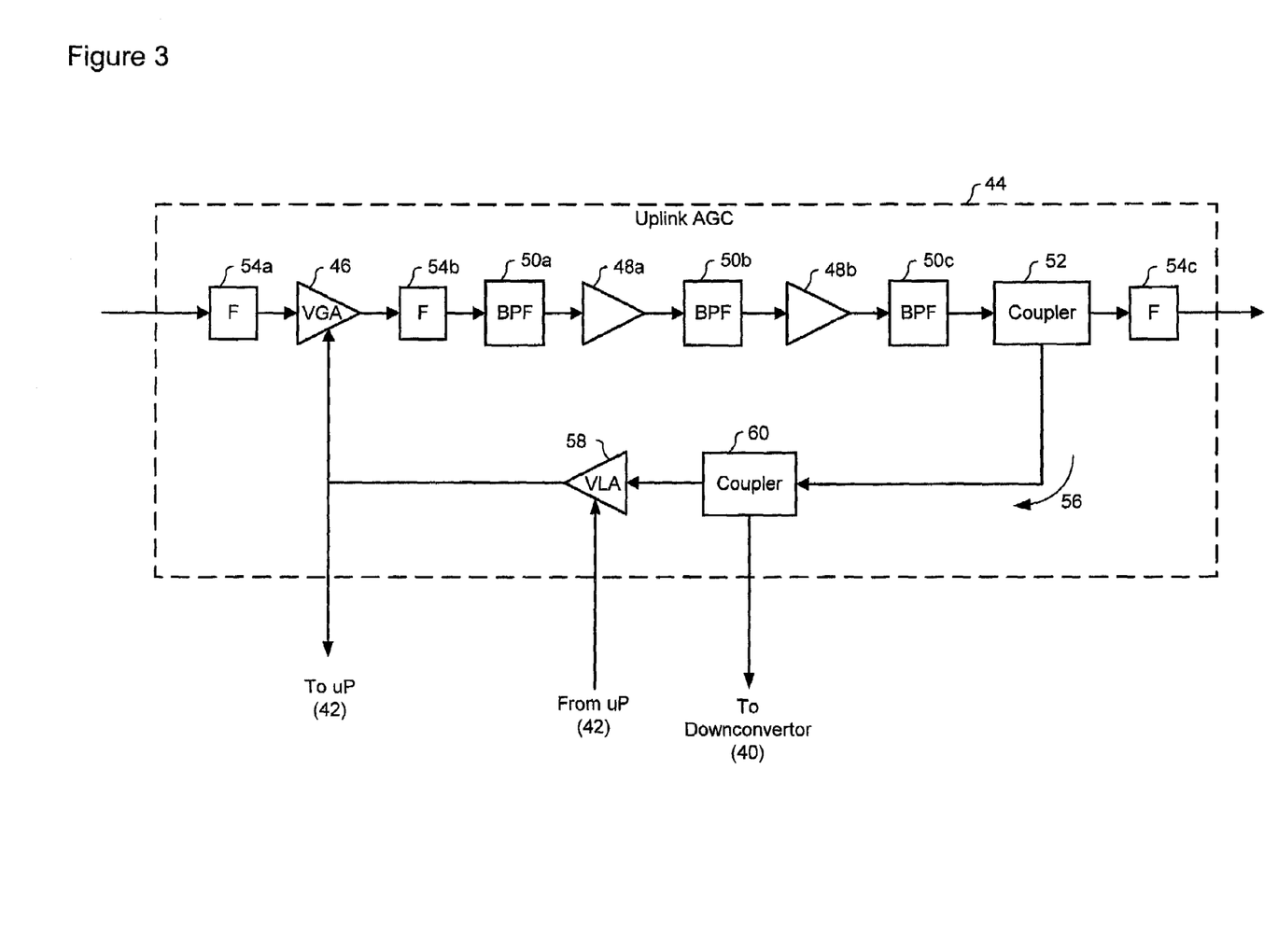
FIG. 3 is a block diagram schematically illustrating principle elements of an exemplary uplink AGC usable in the system of FIG. 2.

The uplink path 36 preferably provides substantially constant output leveling over a wide input range. Thus the ERP of uplink RF signals transmitted to the base station 4 will be substantially independent of variations in the signal power of uplink RF signals received from the WCD 6. In the embodiment of FIG. 3, the uplink AGC 44 is provided as an extremely fast, wide dynamic range, highly linear block including a single VGA stage 46, fixed gain amplifiers 48a and 48b cascaded with band-pass filters 50, and a directional coupler 52. Inter-stage attenuators 54a–54c may also be included to optimize performance. The gain of the uplink AGC 44 has an inverse relationship to the received power of uplink RF signals. Accordingly, the uplink AGC 44 gain is automatically increased as the received uplink RF signal power decreases and the total uplink gain can be controlled by the micro-controller 42.

The VGA 46 preferably has approximately 60 dB of gain variation, and is cascaded with the fixed gain amplifiers 48 to enhance system linearity. The BPFs 50 following the VGA 46 limit the VGA noise to the uplink band, thereby preventing out-of-band signals from capturing the uplink AGC 44 and saturating the uplink output, amplifier 62.

The directional coupler 52, which may be a 17 db directional coupler, samples the uplink RF signal downstream of the VGA 46. The sample signal is supplied to a feedback path 56 comprising an RF Variable Log Amplifier (VLA) 58 and a feedback directional coupler 60 which samples the RF signal within the feedback path 56 and supplies the sample signal to the down-converter 40. The RF VLA 58 is a variable detection amplifier controlled by the micro-controller 42. The output of the RF VLA 53 supplies a gain control signal to the uplink AGC VGA 46 and the downlink slaved VGA 68 (thereby controlling downlink path ERP), and may also be supplied to the micro-controller 42 for decision making in accordance with the Adaptive Control Algorithm (ACA).

The feedback path 56 provides a 25 MHz bandwidth path which operates to ensure system stability by providing substantially instantaneous RF AGC feedback. The feedback path 56 closes the uplink AGC loop, which in turn limits system oscillation by automatically adjusting gain of the VGA 46 in the event of inadequate isolation between the DDA 16 and the SCA 24. The feedback path 56 also provides a means by which the gain of the uplink AGC 44 and the downlink slaved VGA 68 can be forced to a low level by the micro-controller 42 to maintain stability during system setup, thereby ensuring the detection of weak desired signals in the downlink path 38 without the need for initial system isolation maximization, and/or to disable the system if a major fault is detected.

The uplink slaved VGA 46 preferably has approximately 60 dB of gain variation, and accepts a gain control input from the micro-controller 42 to provide a hardware means to modulate the power level of the uplink channel output power.

As shown in FIG. 2, the uplink path 36 may also include an output amplifier stage 62, along with one or more inter-stage filters 64a, 64b. The uplink output amplifier 62 provides a fixed gain to compensate for losses in the coaxial cable 12, while the inter-stage filters 64a, 64b limit cascaded noise.

The downlink path 38 comprises a wide-band downlink automatic gain controller (AGC) 66, and a slaved variable gain amplifier (VGA) 68. The downlink AGC 66 interfaces with the down-converter 40 and the micro-controller 42, as will be described in greater detail below. In preferred embodiments, the downlink path 38 is designed to receive, process and transmit the entire downlink RF channel operating band, for example, North American 800 MHz cellular network has a downlink frequency bandwidth of 25 MHz centered at 881.5 MHz and is divided into carrier A and Carrier B sub-bands.

Figure 4:
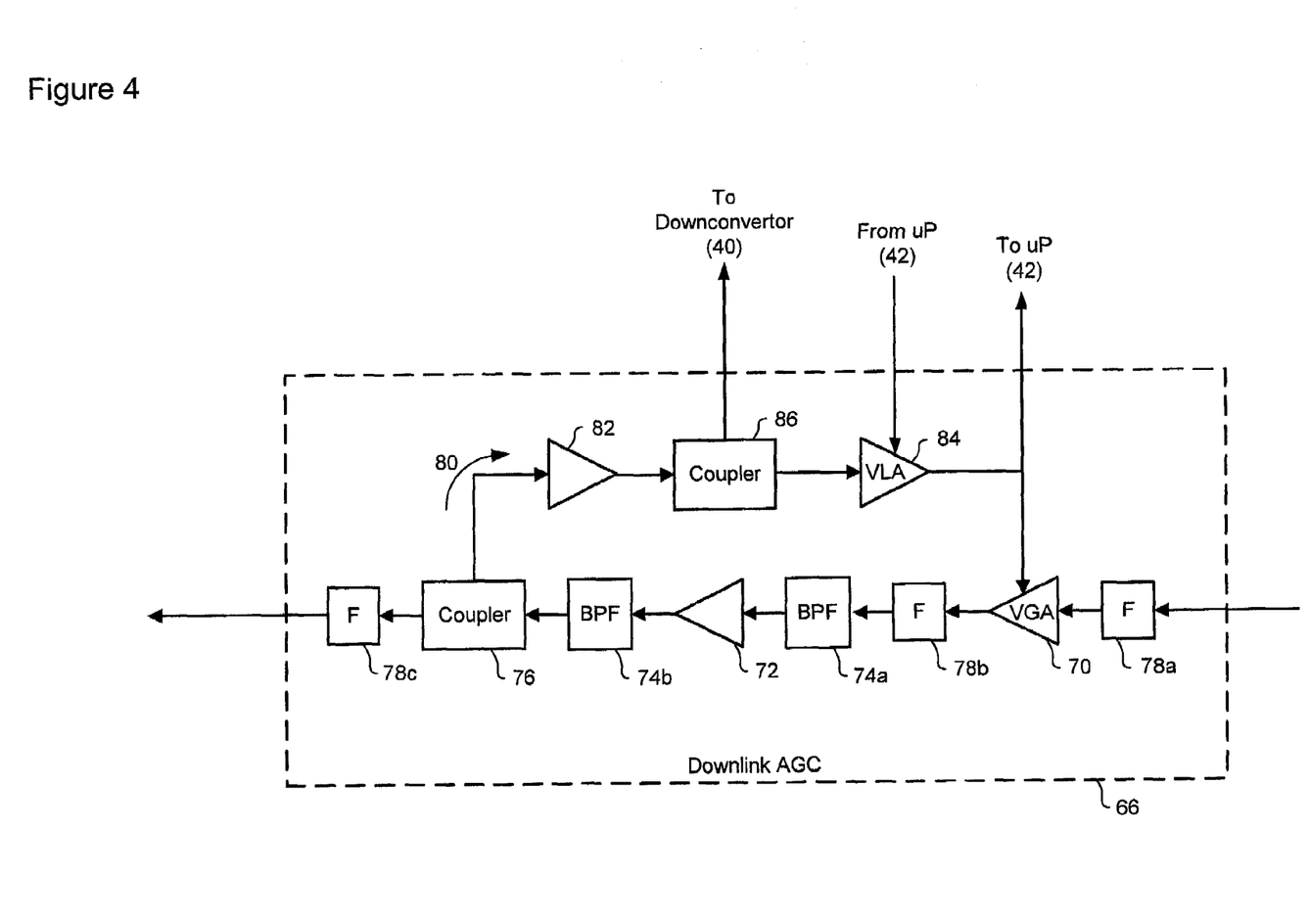
FIG. 4 is a block diagram schematically illustrating principle elements of an exemplary downlink AGC usable in the system of FIG. 2.

The downlink AGC 66 preferably provides substantially constant output leveling over a wide input range. As shown in FIG. 4, the downlink AGC 66 is preferably provided as an extremely fast, wide dynamic range, highly linear block comprising a single VGA stage 70, a fixed gain amplifier 72 cascaded with a pair of band-pass filters 74a and 74b, and a directional coupler 76. Inter-stage attenuators 78a–78c may also be included to optimize performance.

The downlink AGC VGA 70 preferably has approximately 60 dB of gain variation, and is cascaded with the fixed gain amplifier 72 to enhance system linearity while minimizing the cascaded noise figure. The BPFs 74a and 74b operate to limit VGA noise to the 25 MHz downlink bandwidth, thereby preventing out-of-band signals from capturing the downlink AGC 66 and saturating the downlink path output amplifier 90.

The directional coupler 76, which may be a 17 dB directional coupler, samples the downlink RF signal downstream of the VGA 70. The sample signal is supplied is a feedback path 80 which includes a cascaded RF amplifier 82 and RF Variable Log Amplifier (VLA) 84, and a feedback directional coupler 86 which samples the RF signal within the feedback path 80 and supplies the sample signal to the down-converter 40. The RF VLA 84 is preferably a variable detection log amplifier controlled by the micro-controller 42. The output of the RF log amplifier 84 supplies a gain control signal to the downlink AGC VGA 70 and the uplink path slaved VGA 46, and may also be supplied to the micro-controller 42 for decision making in accordance with the ACA. The feedback path 80 preferably provides a 25 MHz bandwidth path which operates to ensure system stability by providing substantially instantaneous RF AGC feedback. The feedback path 80 closes the AGC loop, which in turn limits system oscillation by automatically adjusting gain of the VGA 70 in the event of inadequate isolation between the DDA 16 and SCA 24. The feedback path 80 also provides a means by which the gain of the downlink AGC 66 can be forced to a low level by the micro-controller 42 to disable the system following detection of a major fault.

The downlink slaved VGA 68 preferably has about 60 dB of gain variation, and accepts a gain control input from the micro-controller 42 to provide a hardware means to modulate the power level of the downlink output power.

As shown in FIG. 2, the TGC downlink path 38 may also include a pre-amplifier 88, and an output amplifier stage 90. These elements can be cascaded with a band-pass filter (BPF) 92 and inter-stage attenuators 94a and 94b to reduce cascaded noise and optimize performance. The pre-amplifier 88 operates to preserve the S/N ratio established by the DDU 8, and buffers the port diplexer 34 from BPF 92. This BPF 92, together with the port diplexer 34, limits the downlink bandwidth to 25 MHz, rejecting both image and frequency crossover noise and any out-of-band signals, including RF signals in the uplink path 36. The output amplifier 90 provides a fixed gain to provide the necessary power output to the SCA 24.

Referring again to FIG. 2, the micro controller 42 comprises a micro-processor (not shown) operating under the control of suitable software that implements an Adaptive Control Algorithm (ACA), one or more Digital-to-Analog converters (DACs) 108 and Analog-to-Digital Converters (ADCs) 110 which operate, in a manner well known in the art, to provide translation between digital and analog signal formats, and thereby enable interaction between the micro controller 42 and other elements of the IGC 30. As will be described in greater detail below, the adaptive control algorithm provides the necessary processing control for IGC operation without intervention after installation. It may also control operation during system set-up, in order to simplify installation of the repeater 2.

The ACA provides knowledge-based control of the functionality of the IGC 30, thereby providing dramatically greater versatility than is possible with conventional. (analog math-based) RF signal processing techniques. In accordance with the present invention, the ACA implements technique to distinguish leakage signals within each path 36, 38, and adaptively adjust the gain to maintain a predetermined level of stability. This functionality is described in greater detail below.

In general, the method of the invention involves transmitting a unique signature signal, and monitoring received signals to detect a signal component consistent with the transmitted signature. Correlation between the transmitted signature signal and the detected signal component provides an indication of total signal leakage, and thus the system isolation. Based on this information, the micro-controller 42 can control the gain in each of the paths 36 and 38 to limit the signal leakage to a predetermined acceptable level, and thereby ensure unconditional system stability.

In principle, the signature signal may be provided as any signal pattern that can be reliably detected within the uplink and downlink RF signal traffic. This can conveniently be accomplished by generating a code signal as a predetermined sequence of bits. The number of bits in the sequence can be selected to provide desired properties of speed and reliability. For example, a smaller number of bits can be transmitted, received, and analyzed more rapidly than a longer bit sequence, but at a cost of reduced reliability (due to an increased probability of incorrectly identifying the signature in received RF signals). In addition, a larger number of bits enables correspondingly larger number of unique codes to be defined. In particular, for a bit sequence having n bits, it is well known that $2^n-1$ unique codes can be defined Thus by selecting a suitable sequence length, it is possible to ensure that each repeater 2 is provided with a unique code. This is valuable in situations in which multiple repeaters 2 may be operating with overlapping coverage areas. By ensuring that each repeater 2 has unique code, faulty operation (due, for example, to erroneous identification of a signature signal transmitted by another repeater) can be avoided. Additional reliability can be obtained by selecting each unique code from among a set of orthogonal codes. The use of orthogonal codes increases the probability that the repeater 2 will be able to distinguish its own signature signal from that of another near-by repeater.

Further operational advantages can be obtained by ensuring that each bit sequence is spectrally white. This property, which can be obtained by using a pseudo-random bit sequence, minimizes harmonics and periodic conditions and effects of the signature signal. This, in turn, causes the signature signal to emulate background noise, and thereby mitigates any disturbance in the performance of either the base station 4 or the WCD 6. Also, this property allows the signature detection to be immune to any changes in the propagation paths, 14 and 22 resulting from signal fading or changing multipaths.

Preferably, the signature signal is inserted into RF signal traffic (in either of the paths 36 or 38) as a form of modulation or dither (either in amplitude and/or phase) that instantaneously affects the entire system operating RF bandwidth. This provides for a more accurate estimate of the degree of signal leakage at any frequency of interest. In this case, however, it is important that the signature signal be selected such that it can be inserted into the uplink and downlink paths 36 and 38 without disrupting the RF signal traffic or disturbing the performance of the base station 4 and WCD 6. Thus in preferred embodiments, the signature signal is provided as a low level dither (or fade) imposed on the RF signal traffic (across the entire bandwidth) within each path 36 and 38. By way of example, FIGS. 5 and 6a, b illustrate exemplary operations of the downlink path 38, downconverter 40, and micro-controller 42 for implementing the method of the invention. It will be appreciated that the same operations can equally be implemented in respect of the uplink path 36. However, it will also be appreciated that the method of invention can apply to either the downlink path or the uplink path and slaving the other path gain via the micro-controller.

Figure 5:
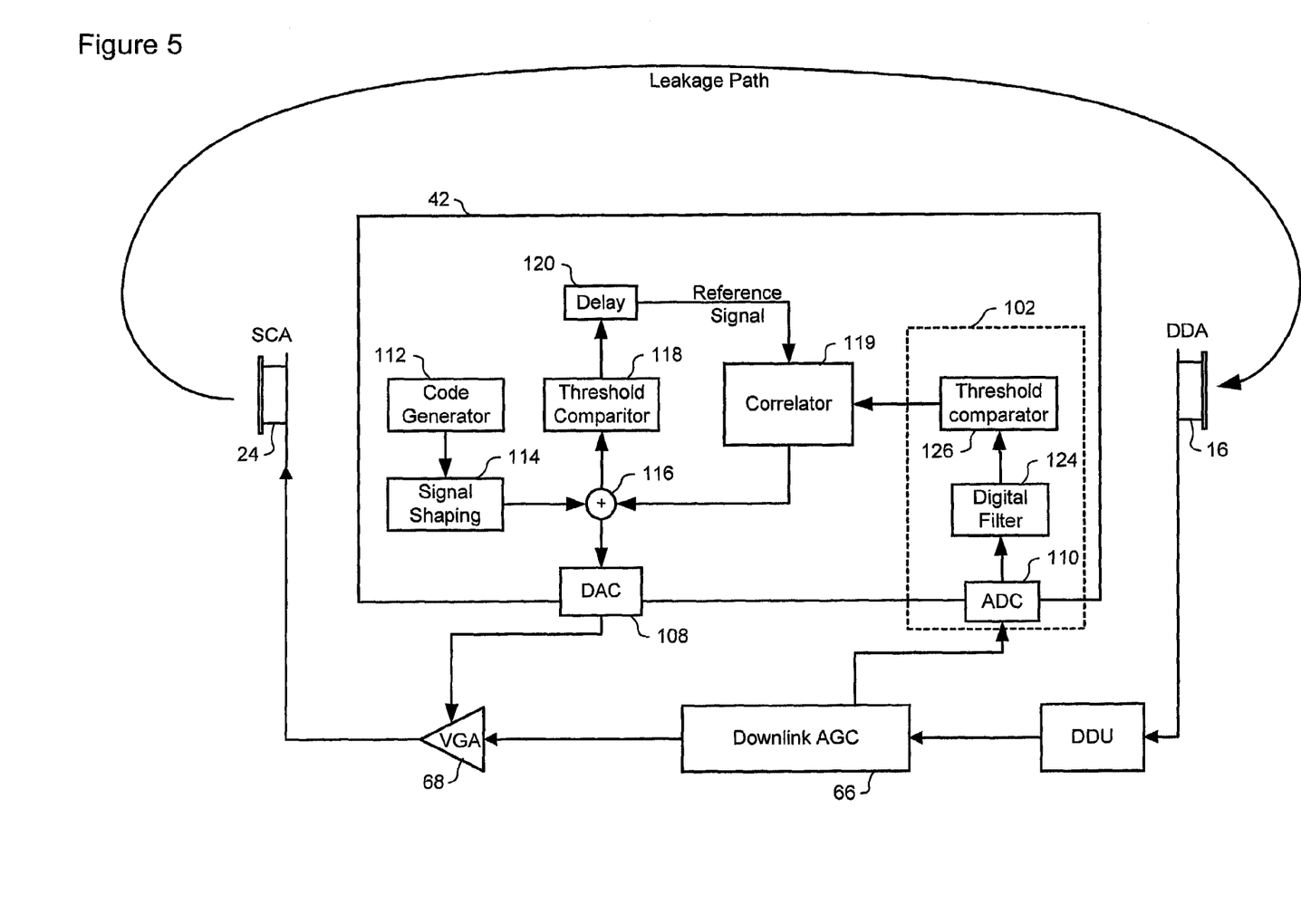
FIG. 5 is a block diagram schematically illustrating exemplary operations of the system of FIG. 2.

As shown in FIG. 5, the micro-controller 42 operates under control of the ACA to implement a code generator 112 that generates a code signal as a predetermined sequence of bits. This code signal can be repeated continuously, or at predetermined intervals, as desired. The code signal is shaped (at 114) (e.g. by modulating the code signal with a predetermined fade) to produce the signature signal, which is then used as control signal for controlling the downlink slaved VGA 68 to modulate the downlink path gain, and thereby insert the signature signal as a low-level amplitude dither of the downlink RF signals transmitted by the SCA 24. The modulation power can be kept low enough (e.g. in the range of 2–5 db) to avoid disrupting the WCD 6, and the variations in signal power will have no effect on the frequency modulated content of the downlink RF signals. The signature signal is also sampled (at 116), digitized by a threshold comparator 118, and subjected to a predetermined delay (at 120) to generate a reference signal.

The length of the delay 120 is preferably selected based on the propagation delay of signals through the leakage path. In some cases, this value may be known in advance, in which case a fixed delay can be used. However, in most cases and depending on the modulation rate, it will not be necessary to detect the propagation delay, since the propagation delay is negligible compared to the correction time. One known method of detecting the propagation delay is to measure the time interval (e.g. using a suitable clock) between generation of the signature signal and detection of signal components in the received RF signals corresponding to the signature. This measured time interval can then be used to determine the delay 120, such that corresponding bits of the signature signal and detected signal components can be processed simultaneously to facilitate correlation of the signature and detected signal components.

The signature detector 102 comprises the AGC detector 84, the samples 110, the digital filter 124 and the threshold comparator 126. The detector 84 of the downlink AGC 66 analyses downlink RF signals received through the DDA 16 to detect all signal components including noise corresponding to the signature signal. For this purpose, the signature detector 102 samples (at 110) the downlink RF signals over the entire RF band, digitally filters the sample signal (at 124), and then compares the sample signal to a predetermined a threshold (at 126) to generate a digitized signal component.

Figure 6A:
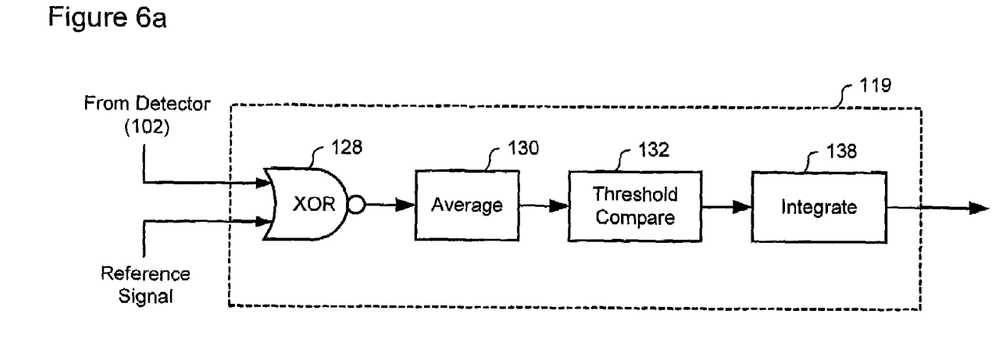
FIGS. 6a and 6b are respective block diagrams schematically illustrating exemplary operations of the control signal generator of FIG. 5.
Figure 6B:
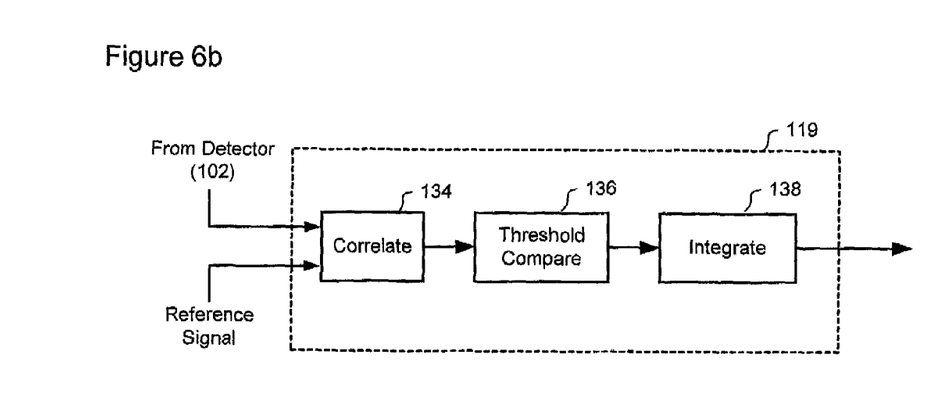

The signal component generated by the signature detector 102 is then correlated in time (at 119) with the reference signal, to obtain an indication of the signal leakage between the SCA 24 and the DDA 16. The micro-controller 42 can then adjust (i.e. increase or decrease, as appropriate) the gain of the downlink VGA 68 to optimize the downlink: path gain. Because the leakage path has the same loss from the SCA 24 to DDA 16 for the downlink and from the DDA 16 to the SCA 24 for the uplink, the micro-controller 42 can also adjust the gain of the uplink VGA 46 accordingly to optimize the uplink path gain. FIGS. 6a and 6b illustrate principle steps in respective alternative methods of correlating the signal component and the reference signal, and generating a gain control signal to adjust the downlink VGA gain which can be implemented by either software or hardware.

As shown in FIG. 6a, a first method of correlating the signal component and the reference signal involves supplying successive bits, of the detected signal component and the reference signal to respective inputs of an Exclusive OR (Ex-OR) logic gate function 128. The result of the Ex-OR operation can then be averaged (at 130) to yield a correlation signal, the level of which is indicative of the similarity between the reference signal and the signal component supplied by the detector 102. In general, a high degree of similarity, which is indicative of a large amount of signal leakage, yields a corresponding high level of the correlation signal. Conversely, a low degree of similarity, which is indicative of a low amount of signal leakage, yields a corresponding low level of the correlation signal. Thus a decision state reflecting whether the amount of signal leakage is above an acceptable limit can be set by comparing the correlation signal to predetermined threshold (at 132).

As shown in FIG. 6b, an alternative method of correlating the signal component and the reference signal involves calculating a correlation function 139 known in the art. The result of the correlation function provides direct indication of the similarity between the reference signal and the signal component supplied by the detector 102. Here again, a high degree of similarity, which is indicative of a large amount of signal leakage, yields a corresponding high result of the correlation function. Conversely, a low degree of similarity, which is indicative of a low amount of :signal leakage, yields a corresponding low result of the correlation function. Thus a decision state reflecting whether the amount of signal leakage is above an acceptable limit can be set by comparing the correlation result to a predetermined threshold 136.

In either of the above embodiments, the threshold comparison result can be integrated at 138 (over time) to eliminate short-period transient effects, and a VGA gain control signal 68 generated using the absolute value of the integration result.

The predetermined threshold level of acceptable signal leakage can be suitably selected to provide a balance between system stability (i.e., resistance to oscillation) and performance of the network and local wireless links 14 and 22. When taken in combination with other sources of isolation between the SCA 24 and the DDA 16 (e.g., front to back ratios of the DDA 16 and SCA 24; polarization loss and propagation losses), it is possible to set a threshold level which ensures unconditional system stability while preserving sufficient range of gain variation in the uplink and downlink paths 36 and 38 to deliver satisfactory performance of the network and local wireless links 14 and 22. Prior art repeaters typically require 10–15 db of isolation/gain margin, Because the method of the present invention is continuously adaptive, 6 dB of isolation/gain margin is possible to maintain an unconditional stable system, with wide variations in gain and isolation changes. This gain improvement of 4 to 9 dB effectively doubles the coverage area, or for a given coverage area allows the repeater to be installed at a distance approximately two times further from the base station than would be possible with prior art systems.

In accordance with a second aspect of the present invention, the unique signature signal can also be used to actively mitigate the effect of spatial nulls within overlapping coverage areas. As described in detail above, each repeater transmits a unique signature signal which is preferably inserted into transmitted signal traffic (in either of the uplink or downlink paths 36 or 38) as a form of modulation or dither (either in amplitude and/or phase) effecting the entire bandwidth of the relevant channel. Generation of the signature signal using a unique pseudo-random bit sequence ensures that each repeater will transmit a unique signature signal. Because the location of spatial nulls is dependent on the phase and amplitude of signals received from, multiple transmitters, any changes in either of these parameters will result in an associated change in the location of a spatial null. A continuous, or periodic, change in either of these parameters, in accordance with the present invention, will therefore produce corresponding movement of spatial nulls within areas overlapping coverage. The use of unique signature signals generated from respective pseudo-random bit sequences, in accordance with the above-described preferred embodiment, yields a pseudo-random movement of every spatial null created by overlapping coverage areas.

The distance and speed of movement will normally be a function of the peak-to-peak modulation power, and the first time derivative of modulation power (which, in turn, is a function of the bit rate of the code used to generate the signature signal). Even a low level signal modulation (e.g. of 2–5 dB) can cause the location of a spatial null to move through a distance of several meters. This level of modulation power, in combination with a moderate bit rate (of, for example, a few kilo-Hertz) can yield a speed of movement on the order of hundreds of meters per second. This degree of spatial null movement dramatically reduces the probability that a subscriber's wireless communications device will be located within a spatial null long enough to interrupt communications.

It will be appreciated that this aspect of the present invention is not limited to areas served by multiple APRs 2, or any specific type of repeater. Rather, the method of the invention can be used to mitigate effects of spatial nulls in any wireless environment in which spatial nulls can form. Thus the present invention may be used to improve communications reliability in any wireless network in which two or more transmitters radiate signals (at the same frequency) into overlapping areas of coverage.

Thus it will be seen that the present invention provides a system capable of adaptively controlling the stability of an on-frequency repeater, and actively controls spatial nulls to prevent loss of communications within overlapping areas of coverage. A unique signature signal is imposed on RF signals transmitted by the repeater, and RF signals received by the repeater analyzed to detect signal components corresponding to the signature The signature and the detected signal component are correlated by the micro-controller, which operates under control of an Adaptive Control Algorithm to adjust the ERP of RF signals transmitted by the repeater to limit signal leakage and thereby control the stability of the repeater. Within overlapping areas of coverage, the unique signature signal causes predetermined, pseudo-random movement of spatial nulls, thereby reducing the probability of a subscriber's wireless communications device suffering loss of signal due to encountering a fixed spatial null.

The embodiment (s) of the invention described above is (are) intended to be exemplary only. The scope of the invention is therefore intended to be limited solely by the scope of the appended claims.

I claim:

1. A method of controlling system stability of an on-frequency repeater, the method comprising steps of:
   generating a signature signal associated with the repeater;
   inserting the signature signal into a first RF signal transmitted by the repeater;
   detecting a correlation between the signature signal and a second RF signal received by the repeater; and
   controlling an effective radiated power (EP) of the first RF signal transmitted by the repeater, based on the detected correlation.

2. A method as claimed in claim 1, wherein the step of generating the signature signal comprises steps of:
   generating a code signal; and
   shaping the code signal.

3. A method as claimed in claim 2, wherein the step of generating the code signal comprises a step of generating a predetermined sequence of bits.

4. A method as claimed in claim 3, wherein the predetermined sequence of bits is spectrally white.

5. A method as claimed in claim 3, wherein the predetermined sequence of bits is pre-selected from among a set of orthogonal bit sequences.

6. A method as claimed in claim 2, wherein the step of shaping the code signal comprises a step of modulating the code signal with a predetermined fade signal.

7. A method as claimed in claim 1, wherein the step of inserting the signature signal intro the first RF signal comprises a step of modulating parameter of the first RF signal.

8. A method as claimed in claim 7, wherein the parameter comprises one or more of a power level and a phase.

9. A method as claimed in claim 7, wherein the step of modulating the parameter of the first RF signal comprises simultaneously modulating the parameter of all RF signals within a predetermined wide-band signal path.

10. A method as claimed in claim 1, wherein the step of detecting a correlation between the signature signal and the second RF signal comprises steps of:
   monitoring the second RF signal to detect at least a signal component consistent with the signature signal;
   comparing the detected signal component to the signature signal, and generating a correlation signal indicative of a degree of similarity between the detected signal component and the signature signal.

11. A method as claimed in claim 10, wherein the step of monitoring the second RF signal comprises steps of:
 sampling the second RF signal;
 digitally filtering the sample signal;
 comparing the filtered signal to a predetermined threshold; and
 generating the signal component based on the comparison result.

12. A method as claimed in claim 10, wherein the step of comparing the detected signal component to the signature signal comprises steps of:
 logically comparing respective successive bits of each of the detected signal component and the signature signal; and
 averaging the comparison result.

13. A method as claimed in claim 12, wherein the step of logically comparing respective successive bits comprises either one of Exclusive ORing, and ANDing successive bits of each of the detected signal component and the signature signal.

14. A method as claimed in claim 10, wherein the step of comparing the detected signal component to the signature signal comprises steps of:
 calculating a cross-correlation of the detected signal component and the signature signal; and
 comparing the calculation result to a predetermined threshold.

15. A method as claimed in claim 1, wherein the step of controlling an effective radiated power (ERP) of the first RF signal comprises steps of:
 comparing the detected correlation to a predetermined threshold value; and
 determining an optimum value of a gain of the repeater using the comparison result.

16. A system for controlling a system stability of an on-frequency repeater of a wireless communications network, the system comprising:
 a signal generator adapted to generate a signature signal associated with the repeater;
 a first modulator adapted to insert the signature signal into a first RF signal transmitted by the repeater;
 a detector adapted to detect a correlation between the signature signal and a second RF signal received by the repeater; and
 a controller adapted to control an effective radiated power (ERP) of the first RF signal transmitted by the repeater, based on the detected correlation.

17. A system as claimed in claim 16, wherein the signal generator comprises:
 a code generator adapted to generate a code signal; and
 a signal shaper adapted to shape the code signal.

18. A system as claimed in claim 17, wherein the code signal comprises a predetermined sequence of bits.

19. A system as claimed in claim 18, wherein the predetermined sequence of bits is spectrally white.

20. A system as claimed in claim 18, wherein the predetermined sequence of bits is pre-selected from among a set of orthogonal bit sequences.

21. A system as claimed in claim 17, wherein the signal shaper comprises a second modulator adapted to modulate the code signal with a predetermined fade signal.

22. A system as claimed in claim 16, wherein the first modulator is adapted to modulate a parameter of the first RF signal.

23. A system as claimed in claim 22, wherein the parameter comprises one or more of a power level and a phase.

24. A system as claimed in claim 22, wherein the first modulator is adapted to simultaneously modulate the parameter of all RF signals within a predetermined wide-band signal path.

25. A system as claimed in claim 16, wherein the detector comprises:
 a monitor adapted to detect at least a signal component of the second RF signal that is consistent with the signature signal; and
 a first comparator adapted to compare the detected signal component to the signature signal, and generate a correlation signal indicative of a degree of similarity between the detected signal component and the signature signal.

26. A system as claimed in claim 25, wherein the monitor comprises:
 a sampler for sampling the second RF signal;
 a filter adapted to digitally filter the sample signal;
 a second comparator for comparing the filtered signal to a predetermined threshold, and generate the signal component based on the comparison result.

27. A system as claimed in claim 26, wherein the first comparator comprises:
 a first signal processor adapted to logically compare respective successive bits of each of the detected signal component and the signature signal; and
 a second signal processor adapted to average the comparison result.

28. A system as claimed in claim 27, wherein the first signal processor comprises either one of an Exclusive OR logic gate, and an AND logic gate.

29. A system as claimed in claim 26, wherein the first comparator comprises a third signal processor adapted to calculate a cross-correlation of the detected signal component and the signature signal.

30. A system, as claimed in claim 16, wherein the controller is adapted to operate under control of software code to:
 compare the detected correlation to a predetermined threshold value; and
 determine an optimum value of a gain of the repeater using the comparison result.

31. An on-frequency repeater of a wireless communications network, the repeater comprising:
 a signal generator adapted to generate a signature signal associated with the repeater;
 a first modulator adapted to insert the signature signal into a first signal transmitted by the repeater;
 a detector adapted to detect a correlation between the signature signal and a second signal received by the repeater; and
 a controller adapted to control an effective radiated power (ERP) of the first signal transmitted by the repeater, based on the detected correlation.

32. An on-frequency repeater as claimed in claim 31, wherein the signature signal associated with the repeater differs from the respective signature signal associated with another repeater.

33. An on-frequency repeater as claimed in claim 32, wherein the signal generator comprises:
 a code generator adapted to generate a code signal; and
 a signal shaper adapted to shape the code signal.

34. An on-frequency repeater as claimed in claim 31, wherein the code signal comprises a predetermined sequence of bits.

35. An on-frequency repeater as claimed in claim 34, wherein the predetermined sequence of bits is spectrally white.

36. An on-frequency repeater as claimed in claim 34, wherein the predetermined sequence of bits is pre-selected from among a set of orthogonal bit sequences.

37. An on-frequency repeater as claimed in claim 33, wherein the signal shaper comprises a second modulator adapted to modulate the code signal with a predetermined fade signal.

38. An on-frequency repeater as claimed in claim 31, wherein the first modulator is adapted to modulate a parameter of the first RF signal.

39. An on-frequency repeater as claimed in claim 38, wherein the parameter comprises one or more of, a power level and a phase.

40. An on-frequency repeater as claimed in claim 38, wherein the first modulator is adapted to simultaneously modulate the parameter of all signals within a predetermined wide-band signal path.

41. An on-frequency repeater as claimed in claim 31, wherein the detector comprises:
   a monitor adapted to detect at least a signal component of the second signal that is consistent with the signature signal; and
   a first comparator adapted to compare the detected signal component to the signature signal, and generate a correlation signal indicative of a degree of similarity between the detected signal component and the signature signal.

42. An on-frequency repeater as claimed in claim 41, wherein the monitor comprises:
   a sampler for sampling the second signal;
   a filter adapted to digitally filter the sample signal;
   a second comparator for comparing the filtered signal to a predetermined threshold, and generate the signal component based on the comparison result.

43. An on-frequency repeater as claimed in claim 41, wherein the first comparator comprises:
   a first signal processor adapted to logically compare respective successive bits of each of the detected signal component and the signature signal; and
   a second signal processor adapted to average the comparison result.

44. An on-frequency repeater as claimed in claim 43, wherein the first signal processor comprises either one of an Exclusive OR logic gate, and an AND logic gate.

45. An on-frequency repeater as claimed in claim 43, wherein the first comparator comprises a third signal processor adapted to calculate a cross-correlation of the detected signal component and the signature signal.

46. An on-frequency repeater as claimed in claim 31, wherein the controller is adapted to operate under control of software code to:
   compare the detected correlation to a predetermined threshold value; and
   determine an optimum value of a gain of the repeater using the comparison result.

* * * * *